United States Patent [19]

Wallace

[11] 4,196,591
[45] Apr. 8, 1980

[54] WAVE POWERED ENERGY GENERATOR

[75] Inventor: Donald W. Wallace, Kenedy, Tex.

[73] Assignees: Robert L. Busselman, Kenedy, Tex.; Occidental Petroleum Corporation, Calif. ; a part interest to each

[21] Appl. No.: 874,315

[22] Filed: Feb. 1, 1978

[51] Int. Cl.² ............................................. F03B 13/12
[52] U.S. Cl. ........................................ 60/497; 60/504; 60/506; 417/332
[58] Field of Search ................ 60/398, 495, 497, 499, 60/502, 504–506; 417/330–333; 290/42, 53

[56] References Cited

U.S. PATENT DOCUMENTS

| | | | |
|---|---|---|---|
| 974,869 | 11/1910 | Farmer | 60/398 |
| 3,200,255 | 8/1965 | Masuda | 290/53 X |
| 3,758,788 | 9/1973 | Richeson | 290/53 X |
| 4,009,396 | 2/1977 | Mattera et al. | 290/42 X |
| 4,105,368 | 8/1978 | Waters | 60/506 X |

*Primary Examiner*—Allen M. Ostrager
*Assistant Examiner*—Stephen F. Husar
*Attorney, Agent, or Firm*—Clarence A. O'Brien; Haarvey B. Jacobson

[57] ABSTRACT

An elongated floatable hull is provided including bottom anchoring structure for anchoring the hull in position above a predetermined bottom portion against horizontal displacement from the aforementioned position, while allowing roll, pitch and heave movements of the hull in response to wave action thereon. Fluid motor and pump structures are supported from the hull and are driven in response to each of the roll, pitch and heave movements of the hull and also various combinations thereof.

22 Claims, 7 Drawing Figures

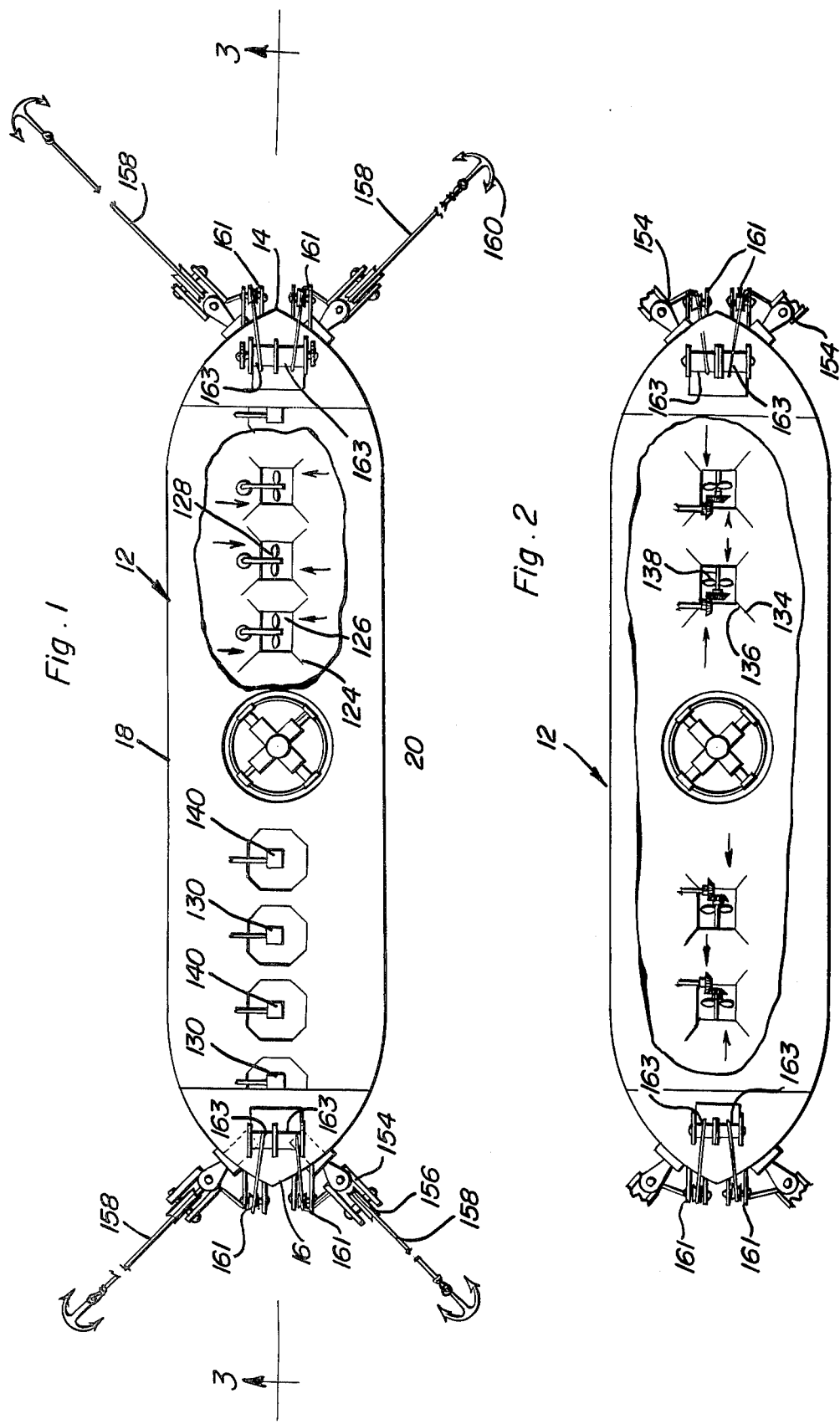

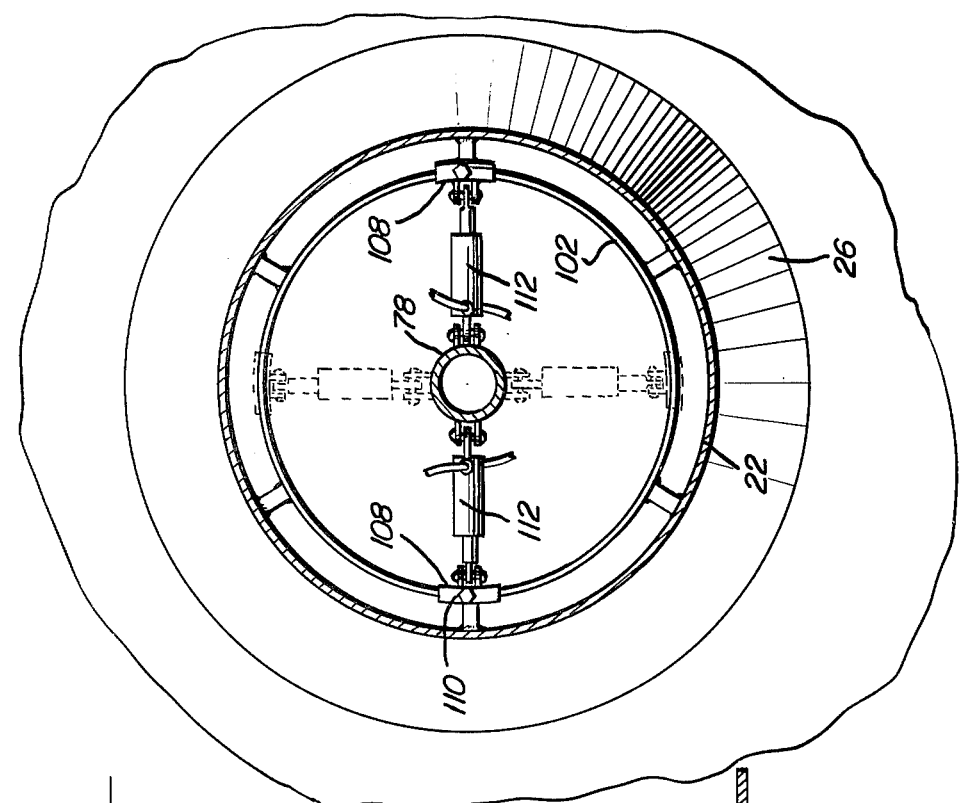
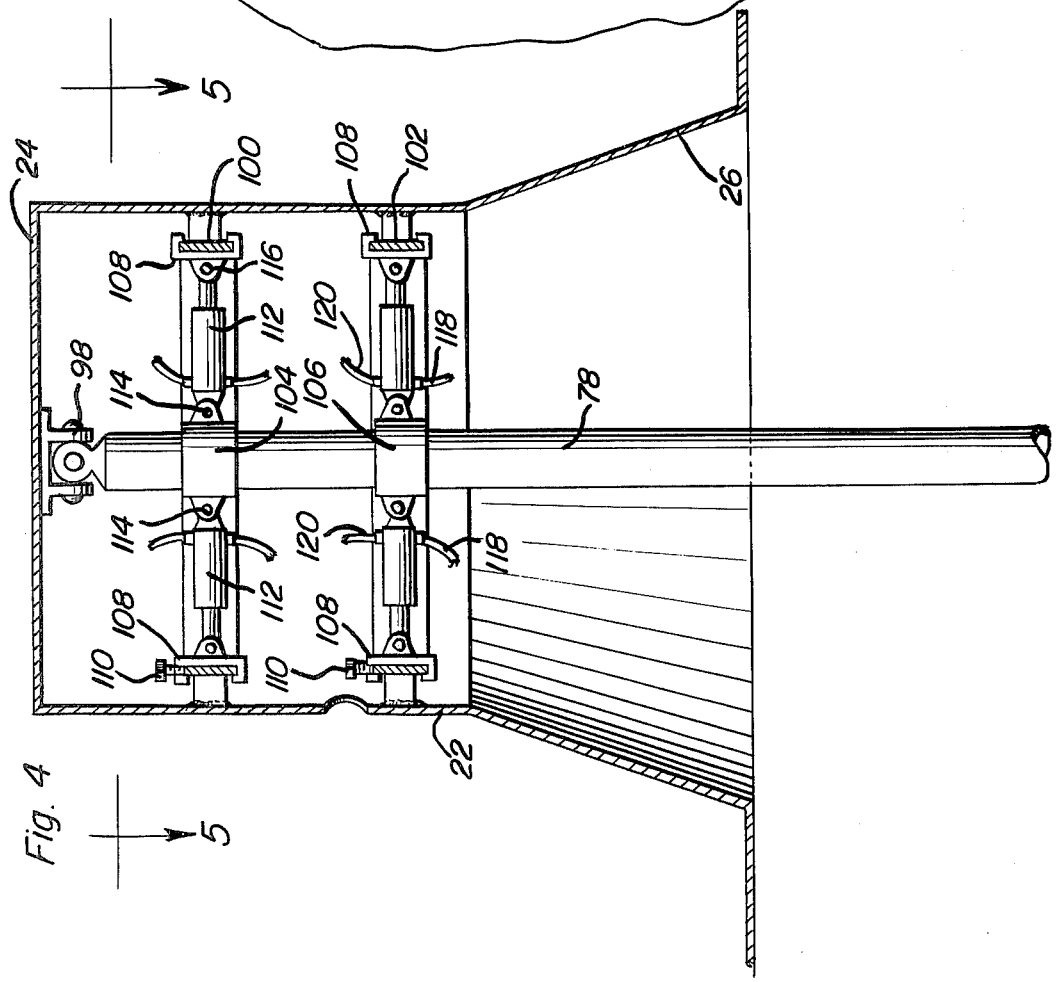

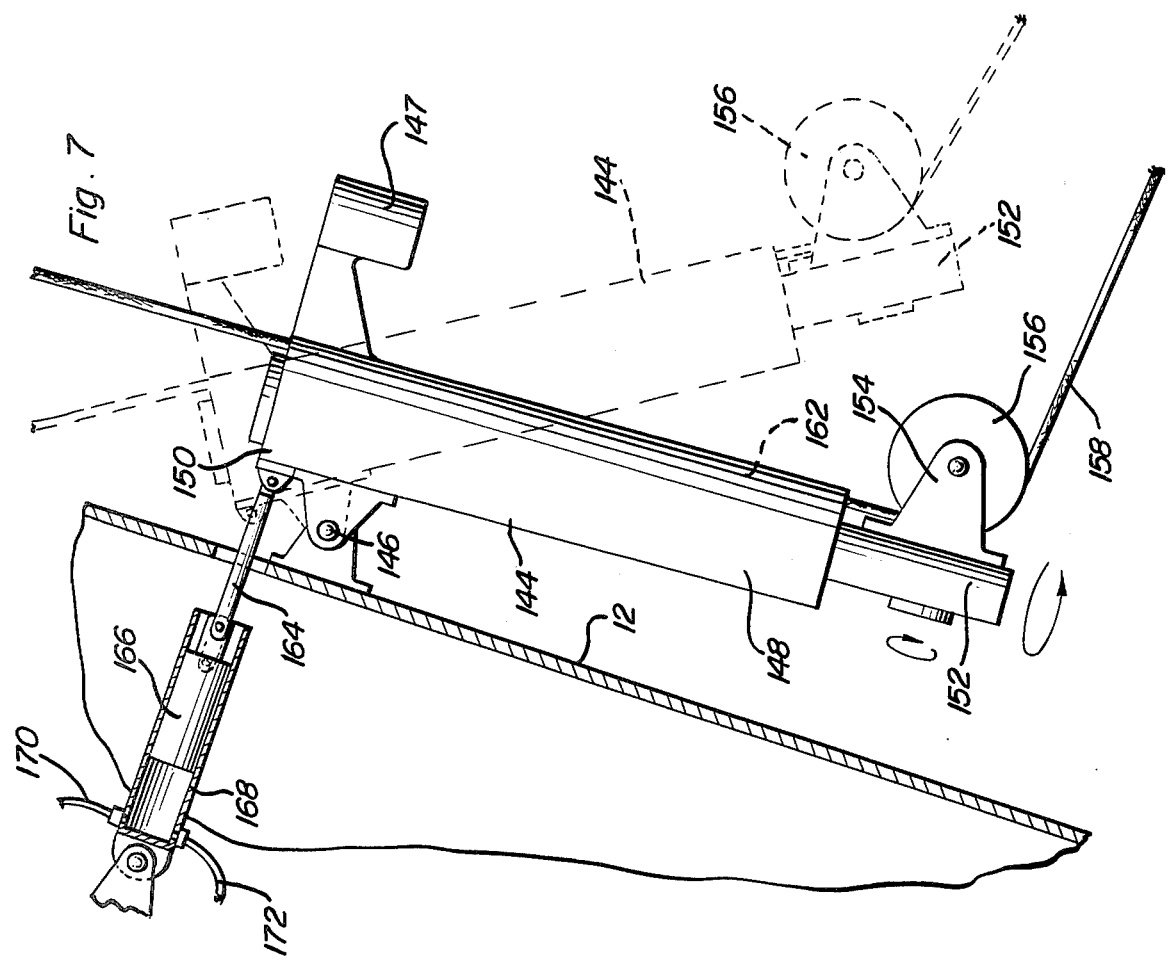
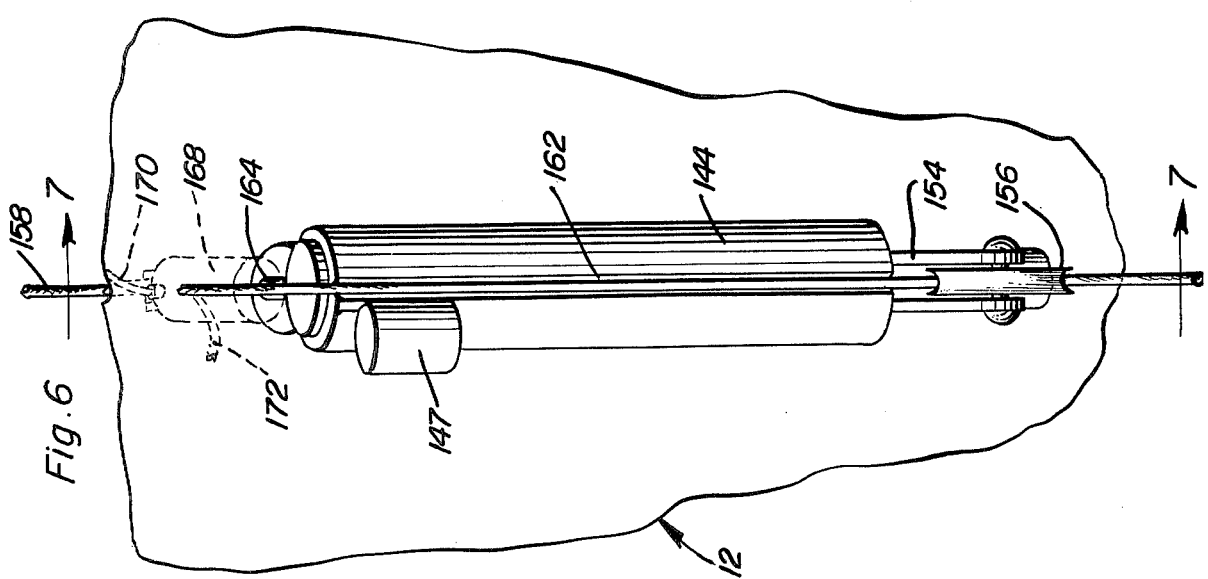

WAVE POWERED ENERGY GENERATOR

BACKGROUND OF THE INVENTION

Various forms of floatable hulls have been heretofore provided including structure whereby rotary torque may be generated in response to roll and pitch movements of the hull. However, floatable hulls of this type and anchored in stationary position above a predetermined bottom portion also experience heave movements as a result of wave action thereon in addition to roll and pitch movements. In addition, some of the previously known forms of anchorable hulls for generating rotational torque in response to roll and pitch movements include various forms of rotational torque developing structures which are not conducive to efficient production of rotational torque. Accordingly, a need exists for an anchorable hull including structure whereby rotational torque may be efficiently produced in response to roll, pitch and heaving movements of the hull.

Examples of various forms of wave and tide powered electric current generators including water flow actuated turbines and float movement powered hydraulic motors and including some of the general structural and operational features of the instant invention are disclosed in U.S. Pat. Nos. 3,064,137, 3,515,889, 3,912,938, 4,009,395 and 4,009,396.

BRIEF DESCRIPTION OF THE INVENTION

The hull of the instant invention is horizontally elongated and thereby includes opposite sides and opposite ends. The center portion of the hull includes a universally supported depending anchor column anchored at its lower end to a bottom anchor by means of a universal connection therewith. The opposite end portions of the hull include lever arm supported fair leads for pairs of opposite side endwise outwardly downwardly divergent anchor cables and the hull includes vertically spaced interior flood decks with one of the flood decks provided with longitudinally spaced transverse passages and the other flood deck provided with longitudinally spaced and extending passages. Each of the passages has a turbine structure journaled therein and the turbine stuctures are therefore driven by the water moving back and forth in the partially filled flood decks from side-to-side and from end-to-end in response to roll and pitch movements of the hull. In addition, the anchor column comprises a telescopic piston-type hydraulic motor whereby hydraulic fluid may be pumped therethrough in response to heaving movements of the hull and the lever arms supporting the fair leads on opposite sides of each of the opposite ends of the hull are connected to reciprocal piston hydraulic pumps and are oscillated back-and-forth in response to roll, pitch and heaving movements of the hull to drive the latter pumps. Further, the lever arms supporting the fair leads are also oscillatable in response to roll movements, only, of the hull, pitch movements, only, of the hull, and heave movements, only, of the hull. The reciprocal piston pumps and the anchor column pump are operative to pump hydraulic fluid into an accumulator for subsequently driving hydraulic motors. Further, the upper end portion of the anchor column, below its upper universal connection with the hull, has circumferentially spaced generally radially outwardly extending extendible piston pumps operatively connected thereto and between the column and the hull and these latter pumps are also operative to pump hydraulic fluid into the accumulator. Further, the turbine structures driven in the flood decks of the hull in response to roll and pitch movements of the hull are drivingly connected to rotary hydraulic pumps which also pump hydraulic fluid into the accumulator. Of course, hydraulic fluid under pressure in the accumulator may be controllably discharged therefrom for driving hydraulic motors in turn coupled to electric current generators.

The main object of this invention is to provide an anchorable hull which may generate considerable power in response to roll, pitch and heave movements of the hull.

Another object of this invention is to provide a hull which will be operative to harness the roll, pitch and heave movements of the hull in an efficient manner in the production of rotary torque.

Still another object of this invention is to provide a hull in accordance with the preceding objects and which may be utilized to its maximum advantage in shoal waters.

A final object of this invention to be specifically enumerated herein is to provide a wave powered energy generator in the form of an anchorable hull in accordance with the preceding objects and which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the wave powered energy generating hull of the instant invention with portions of the top deck broken away and the tower disposed over the upper end of the central well of the hull removed;

FIG. 2 is a top plan view similar to FIG. 1 but illustrating portions of the top deck and also the deck immediately below the top deck broken away;

FIG. 4 is an enlarged, fragmentary, vertical, sectional view of the center well portion of the hull and with the depending anchor column having parts thereof being broken away;

FIG. 5 is fragmentary, horizontal, sectional view taken substantially upon the plane indicated by the section line 5—5 of FIG. 4;

FIG. 6 is a fragmentary, elevational view of one end portion of the hull illustrating the associated fair lead supporting oscillatable lever; and FIG. 7 is a fragmentary, vertical, sectional view taken substantially upon the plane indicated by the section line 7—7 of FIG. 6.

DETAILED DESCRIPTION OF THE INVENTION

Figure 3:
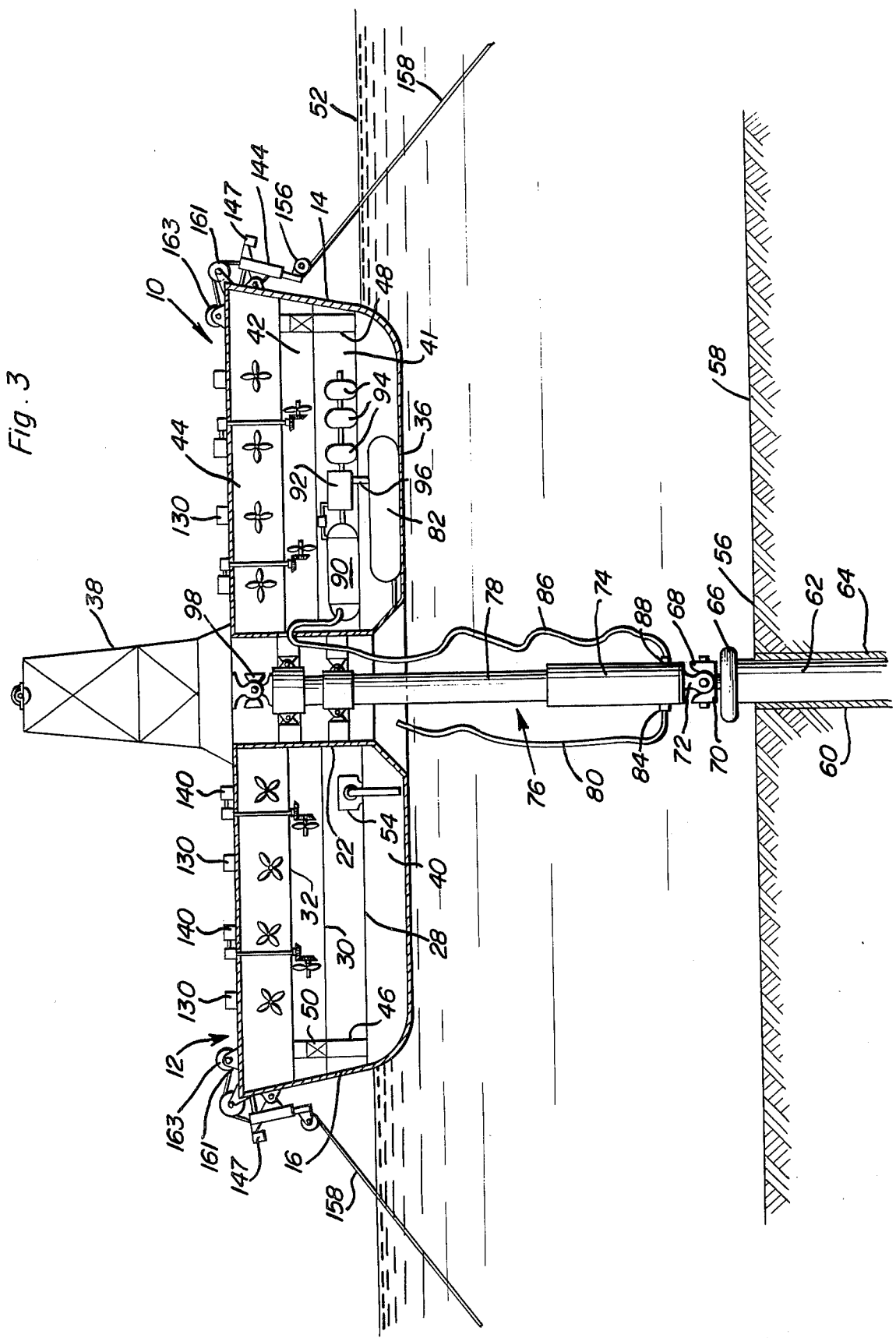
FIG. 3 is a longitudinal, vertical, sectional view taken substantially upon the plane indicated by the section line 3—3 of FIG. 1.

Referring now more specifically to the drawings, the numeral 10 generally designates the wave powered energy generator of the instant invention. The generator 10 includes an elongated hollow hull referred to in general by the reference numeral 12 including opposite ends 14 and 16 and opposite sides 18 and 20. The hull 12 includes a center vertically extending well 22 covered at its upper end by means of a closure 24 and including a downwardly flared open lower end 26. The interior of the hull 10 includes vertically spaced horizontal decks 28, 30, 32 and 34 spaced above the bottom 36 of the hull 12. A derrick structure 38 is mounted on the upper deck 34 of the hull 12 above the closure 24 and may be used for various purposes, including comprising a mounting structure for navigation lights and a micro wave relay system.

The bottom 36 of the hull 12 and deck 28 define a flotation chamber 40 therebetween and a machinery compartment 41 is defined between the decks 28 and 30. A first lower flood compartment 42 is defined between the decks 30 and 32 and a second upper flood compartment 44 is defined between the decks 32 and 34, the well 22 extending upwardly through the decks 28, 30 and 32.

A pair of opposite end internal vertical passages 46 and 48 at opposite ends of the hull 12 communicate the flood compartments 42 and 44 with the flotation chamber 40 and each of the passages 46 and 48 includes a control valve 50 therefor whereby water partially filling each of the flood compartments 42 and 44 may be admitted, by gravity, into the flotation chamber 40 in order to lower water within the hull 12, and thus the metacenter thereof to increase the stability of the hull in rough water. Also, the machinery compartment 41 includes a pump 54 whereby water from the flotation chamber 40 may be pumped back up into the flood compartments 42 and 44.

The hull 12 is anchored over a predetermined portion 56 of the bottom 58 of the body 52. A deep vertical bore 60 is formed in the bottom 58 and a hollow cylindrical anchor casing 62 is cemented in the bore 60 as at 64 and may in turn be internally reinforced with cement or concrete. The upper end of the casing 62 includes a releasable clamp 66 from which one lower section 68 of a universal joint 70 is supported. A second upper section 72 of the universal joint 70 is universally supported from the section 68 and is carried by the lower end cylinder defining portion 74 of an anchor column referred to in general by the reference numeral 76 and including an upper piston defining portion 78. A hydraulic fluid supply line 80 extends from a reservoir 82 within the flotation chamber 40 to the valved inlet 84 of the cylinder defining portion 74 and a hydraulic pressure line 86 extends from the valved outlet 88 of the cylinder defining portion 74 to a hydraulic fluid pressure accumulator 90 within the machinery compartment 41. A hydraulic motor 92 within the machinery compartment 41 receives hydraulic fluid under pressure from the accumulator 90 and drives a plurality of generators 94. The motor 92 includes a discharge line 96 opening into the reservoir 82.

The upper end of the anchor column 76 is anchored to the closure 24 by means of a universal joint 98 corresponding to the universal joint 70 and the interior of the well 22 includes two vertically spaced anchor rings 100 and 102 supported therein. The piston defining portion 78 includes vertically spaced anchor sleeves 104 and 106 rotatably mounted thereon and each of the rings 100 and 102 has a pair of followers 108 mounted thereon for shifting thereabout. Each of the followers 108 includes a set screw 110 for releasably securing corresponding followers 108 in adjusted shifted position about the corresponding ring 100 and a pair of extendible piston fluid pumps 112 have one pair of corresponding ends thereof pivotally anchored to diametrically opposite sides of each of the sleeves 104 and 106 as at 114 and the other pair of corresponding ends of each pair of fluid pumps 112 are pivotally anchored as at 116 to the corresponding followers 108. Each of the pumps 112 includes a valved hydraulic fluid inlet line 118 leading thereto from the reservoir 82 and a valved hydraulic fluid pressure line 120 leading therefrom to the accumulator 90.

The upper flood compartment 44 includes water flow ducting structures 124 defining longitudinally spaced and transversely extending passages 126 extending between opposite sides of the flood compartment 44 and each of the passages 126 has a turbine wheel 128 journaled therein. Each of the turbine wheels 128 is drivingly coupled to a rotary fluid pump 130 supported from the upper surface of the deck 34 and the fluid pumps also include feed lines extending thereto from the reservoir 82 and fluid pressure lines extending therefrom to the accumulator 90. Further, the flood compartment 42 includes longitudinally spaced central water flow ducting structures 134 defining longitudinal water flow passages 136 and a rotary turbine 138 is journaled in each passage 136 and each turbine 138 is drivingly coupled to a rotary fluid pump 140 supported from the upper surface of the deck 34. The rotary pumps 140 also receive hydraulic fluid from the reservoir 82 and pump hydraulic fluid to the accumulator 90.

With attention now invited more specifically to FIGS. 1, 6 and 7 of the drawings, it may be seen that each side portion of each end of the hull 12 has a lever arm 144 oscillatably supported therefrom as at 146 provided with a cantilever weight 147. The lever arms 144 each include a long arm 148 and a short arm 150 and an endwise outwardly projecting rotary extension 152 on the free end of the long arm 148. A fair lead structure 154 including a pulley wheel 156 is rotatably supported from each extension 152 for oscillation about an axis extending transversely of the extension and an anchor cable 158 is passed about each pulley wheel 156 and includes a bottom anchor 160 at its lower end for anchoring in the bottom 58. The upper ends of the cables 158 extend upwardly through slots 162 provided therefor in the levers 144, over guide pulleys 161 and are anchored to the deck 34 by means of winch-type cable anchors 163. The short arms 150 of the levers 144 are operatively connected to piston rod actuating shafts 164 connected in turn to reciprocal pistons 166 of oscillatably supported extendible piston pumps 168 within the hull 12. Of course, the pumps 168 include hydraulic fluid supply lines 170 extending from the reservoir 82 and hydraulic pressure lines 172 extending from the pumps 168 to the accumulator 90.

When the hull is anchored to the bottom 58 in the manner illustrated in FIGS. 1 and 3 of the drawings, heaving movement of the hull 12 in response to wave action causes the pump 74 to pump hydraulic fluid from the reservoir 82 and into the accumulator 90. In addition, heaving action of the hull 12 will also cause oscillation of the levers 144 and therefore reciprocation of the pistons 166 of the pumps 168 whereby the latter will also pump hydraulic fluid from the reservoir 82 to the accumulator 90.

If the hull 12 rolls from side-to-side, the turbines 128 driving the pumps 130 are actuated by the back-and forth flow of water within the flood compartment 44 through the passages 126 and the pumps 130 also pump hydraulic fluid from the reservoir 82 to the accumulator 90. In addition, pitching action of the hull 12 due to wave action causes the water within the flood compartment 42 to flow back and forth to the passages 136 and the turbines 138 to drive the pumps 140. Here again, the pumps 140 receive hydraulic fluid from the reservoir 82 and pump hydraulic fluid under pressure into the accumulator 90.

Heaving action of the hull 12 will also cause extension and contraction of the extendible piston pumps 112 and fluid to be pumped from the reservoir 82 under pressure into the accumulator 90 and it may also be appreciated that roll and pitch movements of the hull 12 also effect oscillation of the levers 144. Further, pitch movements of the hull 12 effect actuation of the extendible piston pumps 112 and one pair of the pumps 112 may be disposed in the phantom line positions thereof illustrated in FIG. 5 at generally right angles relative to the other pair of pumps 112 in order that one pair of pumps 112 may receive full pumping action by roll movements of the hull 12 and the other pair of pumps 112 may receive full pumping action as a result of pitch movements in the hull.

From the foregoing it will be appreciated that the pump 74 is actuated by heaving movements of the hull 12 and that the pumps 130 and 140 driven by the turbines 130 and 138 are actuated by roll and pitch movements, respectively, of the hull 12. Further, the pumps 168 are actuated not only by heaving movements of the hull 12 but also by roll and pitch movements of the hull. The anchor cables 158 diverging outwardly and downwardly from the hull 12 to the bottom anchors 160 insure that either heaving, rolling or pitching movements of the hull will actuate the pumps 168 or any combination of heaving, rolling and pitching movements of the hull will actuate the pumps 168.

The anchor column 76 may be raised by means of the derrick structure 38 for repairs thereon and thereafter lowered to an operative position by the derrick structure after repairs have been made thereto.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a hull including bottom anchoring means for anchoring said hull in position above a predetermined bottom portion against horizontal displacement from said position while allowing roll and pitch movements of said hull in response to wave action, said hull including rotational torque generating means operative to generate rotational torque in response to each of said movements, said rotational torque generating means including coacting means operatively connected between said hull and said bottom anchoring means, said coacting means including means operative to generate rotational torque in response to combinations of said movements.

2. In combination, a hull including bottom anchoring means for anchoring said hull in position above a predetermined bottom portion against horizontal displacement from said position while allowing roll, pitch and heave movements of said hull in response to wave action, said hull including rotational torque generating means operative to generate rotational torque in response to each of said movements, said rotational torque generating means including coacting means operatively connected between said hull and said bottom anchoring means, said coacting means includes means operative to generate rotational torque in response to combinations of at least two of said movements.

3. The combination of claim 2 wherein said torque generating means includes three sets of torque generating means and said coacting means includes means operative to drive each set of said sets of torque generating means in response to a corresponding movement of said movements.

4. In combination, a hull including bottom anchoring means for anchoring said hull in position above a predetermined bottom portion against horizontal displacement from said position while allowing roll, pitch and heave movements of said hull in response to wave action, said hull including rotational torque generating means operative to generate rotational torque in response to each of said movements, said hull including a flood deck in which to receive a quantity of water to partially fill said flood deck, said flood deck defining longitudinally spaced transverse passages extending between the opposite sides of said hull, said torque generating means including rotary turbine members journaled in said passages for rotation about horizontal axes extending transversely of said hull for driving action of said water thereon in response to back and forth movement of said water during rolling movement of said hull.

5. In combination, a hull including bottom anchoring means for anchoring said hull in position above a predetermined bottom portion against horizontal displacement from said position while allowing roll, pitch and heave movements of said hull in response to wave action, said hull including rotational torque generating means operative to generate rotational torque in response to each of said movements, said hull including a flood deck in which to receive a quantity of water to partially fill said flood deck and said flood deck defines longitudinally extending and spaced passages therein, said torque generating means including rotary turbine members journaled in said passages for rotation about horizontal axes extending longitudinally of said hull for driving action of said water thereon.

6. The combination of claim 5 wherein said hull includes a second flood deck in which to receive a quantity of water to partially fill said second flood deck and said second flood deck defines longitudinally spaced transverse passages therein between the opposite sides of said hulll, said torque generating means also including rotary turbine members jourinaled in said transverse passages for rotation about horizontal axes extending transversely of said hull for driving action of said water thereon in response to back and forth movement of said water during rolling movement of said hull.

7. In combination, a hull including bottom anchoring means for anchoring said hull in position above a predetermined bottom portion against horizontal displacement from said position while allowing roll, pitch and heave movements of said hull in response to wave action, said hull including rotational torque generating means operative to generate rotational torque in response to each of said movements, said rotational torque generating means including a depending telescopic anchor column universally supported at its upper end from a center portion of said hull and including bottom anchor structure universally supported from its lower end, said telescopic anchor column including relatively telescopingly engaged cylinder and piston portions of a piston and cylinder type of fluid pump.

8. In combination, a hull including bottom anchoring means for anchoring said hull in position above a predetermined bottom portion against horizontal displacement from said position while allowing roll, pitch and heave movements of said hull in response to wave action, said hull including rotational torque generating means operative to generate rotational torque in response to each of said movements, said rotational torque generating means including a depending telescopic anchor column universally supported at its upper end from a center portion of said hull and including bottom anchor structure universally supported from its lower end, said hull including support portions spaced about the upper portion of said column below its universal support from said hull, and extendible and retractable piston and cylinder-type fluid pumps connected between said column and said support portions and extending generally along angularly displaced radii of the center axis of said column.

9. In combination, a hull including bottom anchoring means for anchoring said hull in position above a predetermined bottom portion against horizontal displacement from said position while allowing roll, pitch and heave movement of said hull in response to wave action, said hull including rotational torque generating means operative to generate rotational torque in response to each of said movements, said torque generating means including opposite end pairs of opposite side levers oscillatably supported from said hull for angular displacement about generally horizontal axes, said levers being disposed in upstanding positions and including lower end fair leads, anchor cables anchored relative to said hull and extending downwardly therefrom and being guidingly engaged with said fair leads, the lower ends of the cables at each end of said hull diverging downwardly and outwardly from opposite sides of said hull and including bottom anchor means for stationary anchoring to the bottom of a body of water upon which said hull is floated and comprising at least a portion of the first mentioned bottom anchoring means, and fluid pump structures operatively connected between said hull and said levers for pumping fluid in response to oscillation of said levers.

10. The combination of claim 9 wherein said rotational torque generating means includes a depending telescopic anchor column universally supported at its upper end from a center portion of said hull and including bottom anchor structure universally supported from its lower end, said telescopic anchor column including relatively telescopingly engaged cylinder and piston portions of a piston and cylinder-type of fluid pump.

11. The combination of claim 10 wherein said rotational torque generating means includes a depending telescopic anchor column universally supported at its upper end from a center portion of said hull and including bottom anchor structure universally supported from its lower end, said hull including support portions spaced about the upper portion of said column below its universal support from said hull, and extendible and retractable piston and cylinder-type fluid pumps connected between said column and said support portions and extending generally along angularly displaced radii of the center axis of said column.

12. The combination of claim 11 wherein said hull includes a flood deck in which to receive a quantity of water to partially fill said flood deck and said flood deck defines longitudinally spaced transverse passages between the opposite sides of said hull, said torque generating means including rotary turbine members journaled in said transverse passages for rotation about horizontal axes extending transversely of said hull for driving action of said water thereon in response to back and forth movement of said water during rolling movement of said hull.

13. The combination of claim 11 wherein said hull includes a flood deck in which to receive a quantity of water to partially fill said flood deck, said flood deck defining longitudinally extending and spaced passages therein, said torque generating means including rotary turbine members journaled in said passages for rotation about horizontal axes extending longitudinally of said hull for driving action of said water thereon.

14. The combination of claim 13 wherein said hull includes a second flood deck in which to receive a quantity of water to partially fill said second flood deck and said second flood deck defines longitudinally spaced transverse passages therein between the opposite sides of said hull, said torque generating means also including rotary turbine members journaled in said transverse passages for rotation about horizontal axes extending transversely of said hull for driving action of said water thereon in response to back and forth movement of said water during rolling movement of said hull.

15. The combination of claim 14 wherein said hull includes a fluid pressure accumulator, rotary fluid motors drivable by fluid under pressure supplied thereto from said accumulator, a fluid reservoir to receive the fluid discharged from said motors, and fluid supply and fluid pressure lines communicating said reservoir with fluid inlets for said pumps and the outlets of said pumps with said accumulator.

16. The combination of claim 15 wherein said hull includes a second flood deck in which to receive a quantity of water to partially fill said second flood deck and said second flood deck defines longitudinally spaced transverse passages therein between the opposite sides of said hull, said torque generating means also including rotary turbine members journaled in said transverse passages for rotation about horizontal axes extending transversely of said hull for driving action of said water thereon in response to back and forth movements of said water during rolling movement of said hull, said hull including a flotation chamber therewithin below said flood decks and into which water within said flood decks may be selectively drained by gravity, said hull further including pump means for pumping water from said flotation chamber into said flood decks.

17. In combination, a hull including bottom anchoring means for anchoring said hull in position above a predetermined bottom portion against horizontal displacement from said position while allowing roll, pitch and heave movements of said hull in response to wave action, said hull including rotational torque generating means operative to generate rotational torque in response to each of said movements, said rotational torque generating means including a depending telescopic anchor column universally supported at its upper end from a center portion of said hull and including bottom anchor structure universally supported from its lower end, said hull including support portions spaced about the upper portion of said column below its universal support from said hull, and extendible and retractable piston and cylinder-type fluid pumps connected between said column and said support portions and extending generally along angularly displaced radii of the center axis of said column, said hull having a central downwardly opening well formed therein, the upper end portion of said anchor column being universally supported within an upper portion of said well, said support portions and said piston and cylinder-type pumps being disposed within said well.

18. The combination of claim 17 wherein said anchor column and said support portions include means for adjustably angularly shifting at least some of said piston and cylinder-type pumps angularly about said center axis.

19. In combination, a hull including bottom anchoring means for anchoring said hull in position above a predetermined bottom portion against horizontal displacement from said position while allowing roll and pitch movements of said hull in response to wave action, said hull including rotational torque generating means operative to generate rotational torque in response to each of said movements, said hull including a flood deck in which to receive a quantity of water to partially fill said flood deck, said flood deck defining longitudinally spaced transverse passages extending between the opposite sides of said hull, said torque generating means including rotary turbine members journaled in said passages for rotation about horizontal axes extending transversely of said hull for driving action of said water thereon in response to back and forth movement of said water during rolling movement of said hull.

20. The combination of claim 19 wherein said hull includes a second flood deck in which to receive a quantity of water to partially fill said second flood deck and said second flood deck defining longitudinally extending and laterally spaced passages therein, said torque generating means including rotary turbine members journaled in said second passages for rotation about horizontal axes extending longitudinally of said hull for driving action of said water thereon.

21. In combination, a hull including bottom anchoring means for anchoring said hull in position above a predetermined bottom portion against horizontal displacement from said position while allowing heave movements of said hull in response to wave and swell action, said hull including fluid pressure generating means operative to generate fluid pressure in response to said heave movements, said fluid pressure generating means including a depending telescopic anchor column universally supported at its upper end from a central portion of said hull and including bottom anchor structure universally supported from its lower end, said telescopic anchor column including relatively telescopingly engaged cylinder and piston portions of a piston and cylinder type of fluid pump.

22. The combination of claim 21 wherein said bottom anchoring means also includes means allowing roll and pitch movements of said hull in response to wave action, said hull including support portions spaced about said upper portion of said column below its universal support from said hull, said fluid pressure generating means including extendible and retractable piston and cylinder-type fluid pumps connected between said column and said support portions and extending generally along angularly displaced radii of the center axis of said column.

* * * * *